United States Patent

[11] 3,600,525

[72] Inventors Jim C. Garrett;
Robert H. Johnson, both of 5060 Salt Lake Avenue, Huntington Park, Calif. 90255

[21] Appl. No. 64,132
[22] Filed July 31, 1970
[45] Patented Aug. 17, 1971
Continuation of application Ser. No. 654,871, July 20, 1967, now abandoned.

[54] TEST SET FOR STROWGER SWITCHES
5 Claims, 3 Drawing Figs.

[52] U.S. Cl. .......... 179/175.21
[51] Int. Cl. .......... HO4m 3/26
[50] Field of Search .......... 179/175, 175.2, 175.2 A, 175.23, 175.21; 317/107, 120; 324/114, 149, 156

[56] References Cited

UNITED STATES PATENTS

| | | | |
|---|---|---|---|
| 617,418 | 1/1899 | Hanchett et al. .......... | 324/156 |
| 625,830 | 5/1899 | Cox .......... | 324/149 |
| 1,334,767 | 3/1920 | Lundell et al. .......... | 179/175.23 |
| 1,482,891 | 2/1924 | Ghegan .......... | 317/120 |
| 2,397,975 | 4/1946 | Obermaier .......... | 324/156 |
| 2,426,712 | 9/1947 | Simpson .......... | 324/156 |
| 2,597,188 | 5/1952 | Rozett .......... | 324/149 |
| 2,680161 | 6/1954 | Clement .......... | 179/175.2 |
| 2,797,268 | 6/1957 | Reagan .......... | 179/175.23 |
| 3,027,429 | 3/1962 | Eklov .......... | 179/1 |
| 3,265,820 | 8/1966 | Edwards .......... | 179/175.21 |

*Primary Examiner*—Kathleen H. Claffy
*Assistant Examiner*—David L. Stewart
*Attorney*—Hyman Jackman

ABSTRACT: A test set particularly for equipment such as PBX, CDO and large telephone central offices, and comprising a hand-portable and compact boxlike, case-type unit in which is incorporated means to test timing and pulsing, Strowger two-motion switch "A" relay current flow, polarity across the lines, and amplified push-to-talk circuits of such equipment.

INVENTORS
JIM C. GARRETT
ROBERT H. JOHNSON
BY
C. G. Stratton
ATTORNEY

INVENTORS
JIM C. GARRETT
ROBERT H. JOHNSON
BY
C. G. Stratton
ATTORNEY

TEST SET FOR STROWGER SWITCHES

CROSS-REFERENCES TO RELATED APPLICATIONS

This is a continuation of application Ser. No. 654,871, filed July 20 1967, now abandoned

BACKGROUND OF THE INVENTION

For testing the various telephone systems, as above, to locate malfunction and pinpoint troubles, especially after a pattern of the same has been developed, in the past entailed the use of large, expensive and difficult-to-transport apparatus. Setup time for such equipment is usually lengthy and, therefore, undesirable economically. Also, particularly high skill is required both for setup and for carrying out the different tests. Moreover, such three-part old type of testing equipment required a separate telephone handset for monitoring the tests that were carried out.

In contradistinction to the great skill needed for testing telephone equipment, an object of this invention is to provide a small, compact and lightweight test set that may be employed even by inexperienced switch men to test the operation of step-by-step equipment embodying Strowger switches under simulated operating conditions.

Another object of the invention is to provide a test set, as above characterized, that eliminates time-consuming setup and, in larger central offices provided with built-in apparatus, complements the same and is particularly effective in pinpointing troubles after such built-in apparatus has developed a pattern.

This invention also has for its objects to provide such means that are positive in operation, convenient in use, easily installed in a working position and easily disconnected therefrom, economical of manufacturer, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

SUMMARY OF THE INVENTION

The present test set comprises, generally, a two-part case 5 (in practice, 7¼ inches square and 7¼ inches deep), the present checking and testing mechanism 6 being mounted in one case part 7 and a suitable power cord 8 and test cord 9 being stored in the other case part 10.

BRIEF DESCRIPTION OF THE DRAWINGS

In the drawings, like reference characters designate similar parts in the several views.

DESCRIPTION OF THE PREFERRED EMBODIMENT

Figure 1:
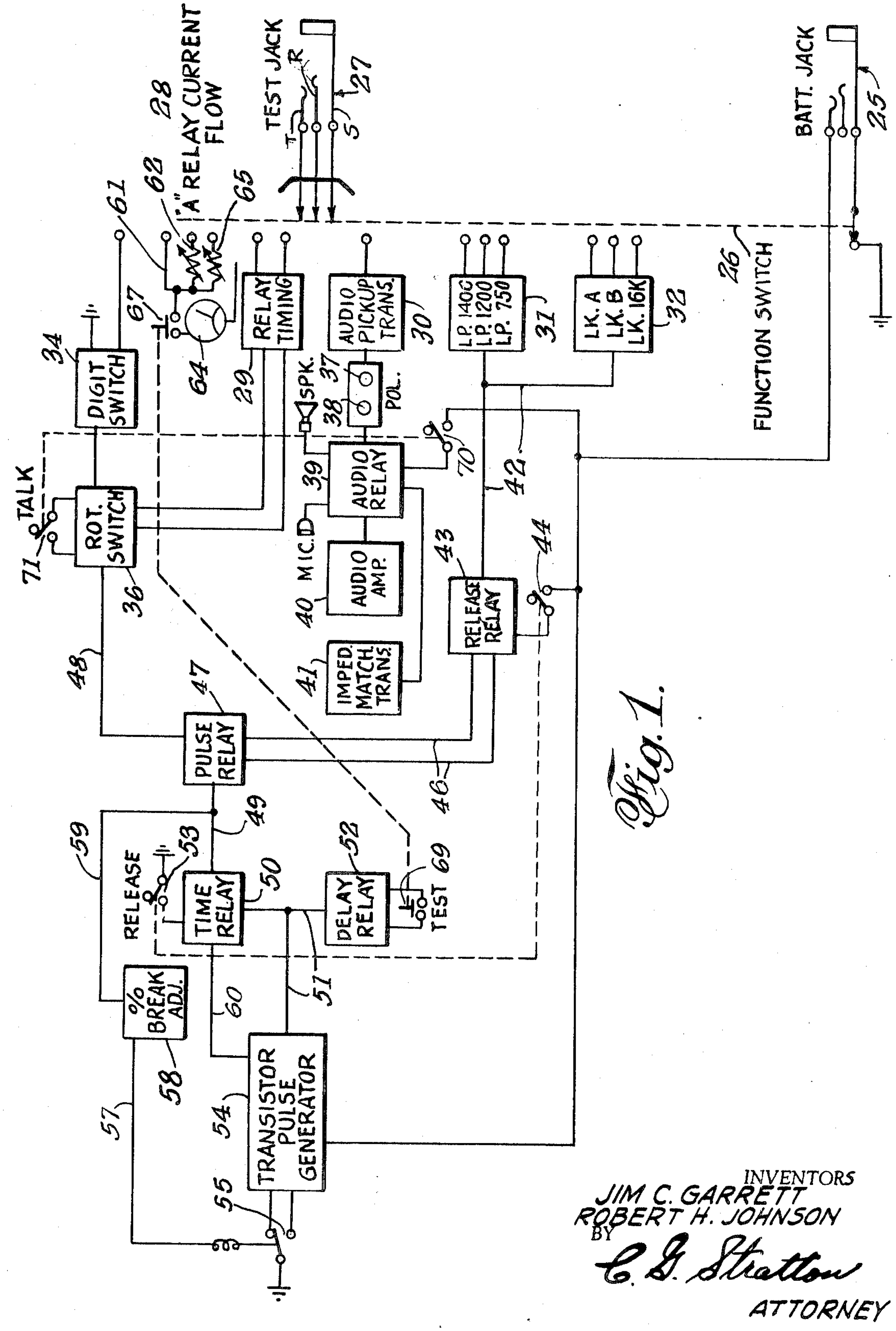
FIG. 1 is a block diagram of the checking and testing mechanism of the present invention.

The case 5 is a carrying case and may, if desired, be provided with a shoulder strap not shown or may be carried by its handle 15 affixed to the case part 7. Also, a strap to mount the case on a support, post or ladder in handy testing position, may be provided on the case part 7. The two parts 7 and 10 may be separably connected, as by a laterally separable hinge 16 at the bottom of the case, and a trunk latch or catch 17 on the top. The part 10 is provided with a hinged false bottom 18 that is held in place by a catch 19 so as to enclose a space 10 in which the cords 8 and 9 and the harness strap are stored, and from which the same may be removed to connect the checking and testing means 6 to a power source and to the various components of the equipment to be checked and tested for the operating condition thereof.

Figures 2, 3:
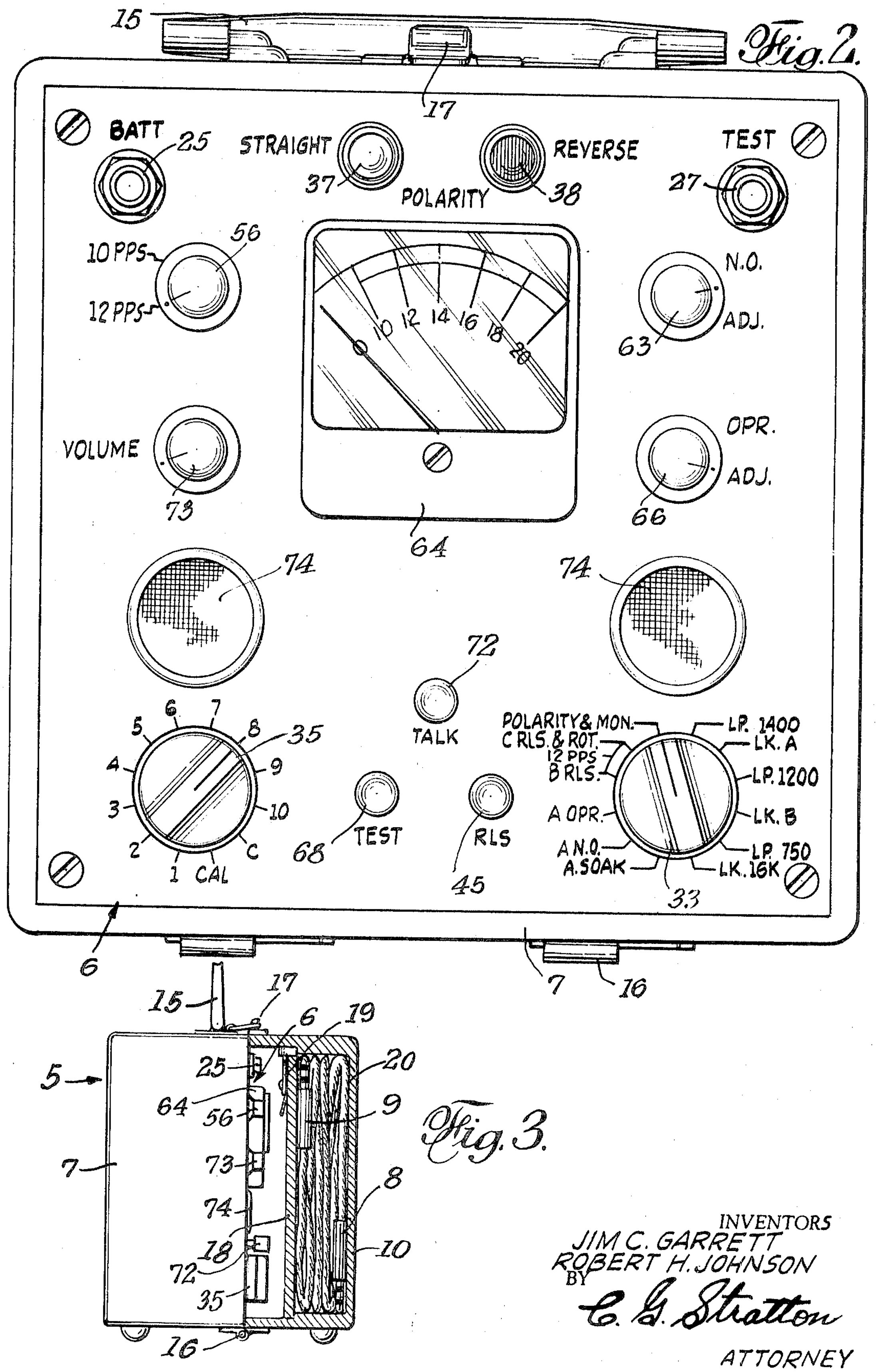
FIG. 2 is a face view, showing the controls of said mechanism.
FIG. 3, to a reduced scale, shows the two-part case in which said mechanism is contained, as well as the power and test cords required to connect the mechanism to power and to the telephone equipment being tested.

The checking and testing mechanism 6 is shown as comprising, generally, a battery jack 25; a mode or function switch 26 connected to said jack; a test jack 27 also connected to the function switch, the function switch, being of the stacked-wafer type having 12 positions in this case, is connected to "A" relay current flow components 28 (A-Soak), "B" and "C" relay timing components 29, an audio pickup transformer 30, a loop-pulsing component 31, and a leak-pulsing component 32; the knob 33 Fig. 2 being provided for adjusting the position of the function switch 26 with relation to the above-listed components 28 to 32 and as indicated by the indicia related to said knob; a digit switch 34 controlled by a knob 35 which selects the number of pulses supplied to the Strowger two-motion switch of the apparatus being tested; a rotary switch 36 having its pulsing functions controlled by the knob 35 according to the control of the digit switch 34 by said knob; the transformer 30 being series-connected to the straight light 37 for designation correct polarity across the tip and ring of the line and a reverse light 38 for designating a reverse indication thereof; an audio relay 39 connected to a speaker and a microphone and connected in series with both said lights; a solid-state audio amplifier 40 for and connected to said relay 39; an impedance-matching transformer 41 connected to the audio relay 59; a line 42 from the network of each pulsing component 31 and 32, according to the different resistance values thereof, connects the same to the contacts of a release relay 43, which is energized by one key 44 that is operated by a release button 45; a connection 46 from the relay 43 to a pulse relay 47 which, through a line 48, is connected to drive the rotary switch 36 and which, through a line 49, is connected to a time relay 50 and the latter, by a line 51, to a delay relay 52; a second release key 53, controlled by said button 45, when closed releases the relays 50 and 52; a transistor pulse generator 54 connected to said line 51 and to current through the jack 25; a PPS (pulses-per-second) switch 55, controlled by a selective knob 56 that may be set for 10 or 12 pulses, is connected to the generator 54 and has a conductor 57 that extends to and electrically connects with a percent break-adjusting, preset rheostat unit 58 which, in turn, has an input connection 59 to the pulse relay 47; and the generator 54, through a line 60 and the contacts of the time relay 50, drives the pulse relay 47 through line 49, the latter, in turn, driving the rotary switch 36.

The A-Soak components 28 comprise a short 61 for the A-Soak function of said component, a variable resistor 62, controlled by a knob 63, for the nonoperate value of a DC milliammeter 64, and a second variable resistor 65, controlled by a knob 66, for the operate value of the milliammeter.

A test key 67, controlled by a button 68, connects the component 28 to the meter 64 which has a return connection, through the test jack and, therefore, to the Strowger switch under test. A second test key 69, controlled by the same button 68, closes the circuit through the delay and time relays to the solid-state pulse generator 54, the latter thereby activating the pulse relay 47.

Said switches 67 and 69, while being actuated by the same button, are independently closed according to the various settings of the function switch 26, under control of the knob 33. A switch 70 connects the audio relay 39 to power, and a switch 71 changes the B-relay timing of the component 29 from a higher testing to a lower testing standard or value, a single button 72 closing said push-to-talk feature.

A volume control 73 may be provided for the audio speakers represented by the grills 74.

The cords 8 and 9 are plugged into the jacks 25 and 27, respectively, with their ends clipped or otherwise electrically connected to the components under test.

OPERATION OF THE SET FOR VARIOUS TESTS

In all tests, the circuit to the Strowger telephone switch under test is through the terminal T of the test jack 27, to the function switch 26, and from the ring terminal R of said test jack 27 through the release key 44 to another level of the function switch. Therefore, all circuit descriptions for the different tests will start at the function switch 26.

A-Soak TEST

Circuit, from the function switch, follows the short 62 placed across the "A" relay at another level of the function switch.

A-NONOPERATE (A N.O.) TEST

From the function switch through variable resistor 62, a nonoperate adjust, through the milliammeter 64 back to the function switch.

A-OPERATE (A OPR.) TEST

From the function switch through variable resistor 65, an A-Operate adjust, through said milliammeter back to the function switch.

B-RELEASE TEST

From the function switch 26 to PPS switch 55, to the rotary switch 36 and back to the function switch. This allows the test to be made only in 12 PPS for correct timing of B-Release. The same holds true for C-Release and Rotary Test and for the same reason.

To initiate this test, it is necessary to place the digit switch 34, by means of the knob 35, to the "C" position (continued pulsing). This allows the rotary switch 36 to step continuously. In any other position of the digit switch, a contact thereof is grounded, depending on the setting of said switch. This ground stops the output of the pulse generator 54 and shuts down the time relay 50 at the proper time, thereby giving the correct number of pulses to the Strowger switch under test.

For this test, it is also necessary to place the PPS switch 55 in the 12 PPS position by means of the knob 56, and to then press the test button 68 to get the pulses of the time and delay relays 50 and 52. The latter then activate the pulse relay 47 which causes stepping of the rotary switch 36 the desired number of steps, thereby continuously pulsing the Strowger switch under test. In the usual way, shorted terminals of the switch 36 give the timing values.

C-RELEASE AND ROTARY TEST

From the function switch 26 to the PPS switch 55, to another level of the rotary switch and back to the function switch. Also, in this position, a ground is placed on the sleeve S of the test jack 27 for the purpose of making the switch under test rotate the required number of steps in a prescribed period of time. This ground to the sleeve comes from a level of the function switch.

POLARITY AND MONITOR

From the function switch through the release relay 43 through a low resistance 200-ohm winding of the audio pickup transformer 30, which has a 200/1000 ohm capacity, to the polarity lights 37 and 38 and back to the switch. Said lights have their diodes in back-to-back relation thereacross, thereby determining which light will illuminate according to the polarity encountered.

The audio monitor portion of this function is as follows: the audio is picked up through the transformer 30 and goes through the audio relay 39 to the volume control represented by the knob 73 where the desired level is adjusted in a conventional manner. The audio then goes to the amplifier 40, and the output thereof to the audio relay 39 and out to the speaker connected thereto.

The talk function is accomplished by pressing the button 72 to close the switches 70 and 71. This applies battery to the audio relay 39, which transfers the microphone to the input of the amplifier 40 and also switches the output to the impedance-matching transformer 41 (8 to 1000 ohms). This matches the amperage output to the 1000 ohms of the audio pickup transformer 30. The volume-adjust has no control of the talk circuit.

In the following loop tests, the circuit path is from the function switch 26 through a loop resistor of the pulsing component 31 and back to the function switch. The only difference is whether the resistance value is 1400 1200 or 750 ohms, according to the setting of the knob 33.

In the following leak tests, the circuit path is from the function switch through the leak-pulsing component 32 and back to the function switch. The only difference is whether the value of parallel capacitance and/or resistance is 10,250 ohms paralleled by 5K ohms in series with 2 MF capacitance for the LK.A setting of knob 33; 10,250 ohms of parallel resistance for the LK.B setting; or 16K ohms of parallel resistance for the LK. 16K setting.

The tests, starting with Polarity-Monitor clockwise to LK 16K, can be made in either 10—or 12—PPS; this switch only changes the resistor in the timing of the trigger circuit which determines the speed.

The percent break is established for leak and loop tests. Leak—60.5 percent break and loop—68.5 percent break. This established value is met when the set is calibrated. The proper resistor for each is picked whenever a loop or leak function is selected or the speed is changed while in loop or leak.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

We claim:

1. A test set for telephone equipment having Strowger, two motion switches, comprising:

a. function switch means having a plurality of switch sections each having a wiper and a plurality of terminals adapted for electrical connection in accordance with each individual test to be performed;

b. a battery jack having tip, ring and sleeve contacts, said sleeve contact being connected to the wiper of a first one of said switch sections of said function switch means and to a DC source when the function switch means is in a predetermined position;

c. a test jack having tip, ring and sleeve contacts each respectively connected to the wiper of a corresponding one of the remaining switch sections for carrying out the testing of said equipment;

d. manually operable selector means common to all switch sections for selecting the terminals of said function switch means;

e. A-relay current flow means responsive to operation of said selector means for establishing current flow within predetermined limits;

f. means including B-relay timing means and C-relay timing means responsive to operation of said selector means for transmitting from said test set to said Strowger switch a continuous train of pulses at a predetermined rate;

g. audio transformer means responsive to operation of said selector means for providing an audio connection with said equipment under test;

h. loop-pulsing means responsive to operation of said selector means and including resistive means in circuit with said equipment under test;

i. leak-pulsing means responsive to operation of said selector means and including paralleled resistive-capacitive means in circuit with said equipment under test;

j. a digit switch selectively movable to a plurality of positions each position supplying a different predetermined number of timing pulses;

k. a rotary pulsing switch controlled by said pulses from said digit switch;

l. polarity indicating light means connected to said audio transformer means for indicating straight and reversed polarity indications of said tip and ring contacts of said test jack;

m. audio signal indicating means in series connection with said light means;

n. key-controlled release relay means in electrical connection with said loop-pulsing means and said leak-pulsing means;

o. pulse relay means connected to said release relay means for pulsing said rotary pulsing switch;

p. a key-controlled time relay connected to and operated by said pulse relay and including contact means;

q. a delay relay connected to said time relay and including a test key in operative connection therewith;

r. a pulse generator connected to said DC source through said battery jack;

s. a selectively operable pulses-per-second switch connected to said generator to select the pulse repetition rate of said generator;

t. a percentage-break adjusting rheostat connected to said pulses-per-second switch and having an input connection to said pulse relay means;

u. said generator being connected through said contact means of said time relay to said pulse relay to thereby operate said rotary switch as said pulse relay is pulsed;

v. current indicating means including a test key in series therewith for indicating said current flow associated with said A-relay current flow means; and w. said test key having a mechanical interconnection to said key-controlled delay relay thereby providing a circuit for actuating said pulse relay means.

2. A test set according to claim 1 in which an audio relay is serially connected to said audio transformer means and further connected in series with said polarity indicating light means, said audio relay being connected to a microphone and speaker means having an amplifying means therefor, and an impedance-matching transformer connected to said audio relay.

3. A test set according to claim 1 in which variable resistance means are in serial connection with said terminals and said current indicating means for establishing nonoperate and operate current values as indicated by said current indicating 4. A test set according to claim 1 in which both the test key in series with said current indicating means and said test key of said delay relay are provided with a common actuator.

5. A test set according to claim 2 in which a switch connects said audio relay to said battery jack.